United States Patent Office 3,562,769
Patented Feb. 9, 1971

3,562,769
PROCESS FOR THE PREPARATION OF PHOSPHORIC ACID
Yujiro Sugahara, Tokyo, Hiroyuki Naito, Tsuruoka-shi, Masahide Ogawa, Nakajo-machi, and Jinichi Igarashi, Tsuruoka-shi, Japan, assignors to Mizusawa Kagaku Kogyo Kabushiki Kaisha, Higashi-ku, Osaka, Japan, a corporation of Japan
No Drawing. Filed May 14, 1968, Ser. No. 728,876
Claims priority, application Japan, May 17, 1967, 42/30,846
Int. Cl. C01b 25/22
U.S. Cl. 23—165                          10 Claims

ABSTRACT OF THE DISCLOSURE

A process for the preparation of phosphoric acid which comprises adding at least one disintegration-preventing agent selected from the group consisting of alkali metal salts and amorphous silica and sulfuric acid to calcium phosphate or phosphate rock, heating the resultant mixture to 100–300° C. to convert the same to perfectly solid, non-disintegrable small masses, and thereafter extracting the phosphoric acid component from the masses.

---

This invention relates to a novel process for the preparation of phosphoric acid. More particularly, the invention relates to a novel process for the preparation of phosphoric acid, in which the reaction product of phosphate rock with sulfuric acid is maintained in the form of non-disintegrable small masses during the extraction of the phosphoric acid component.

Conventionally, the process for the preparation of phosphoric acid by the steps of reacting phosphate rock with 30–50% aqueous sulfuric acid and separating the phosphoric acid so formed from the by-product gypsum by filtration, has been known for the production of phosphoric acid by the wet process. However, in the wet process, gypsum is by-produced as extremely fine crystals. Accordingly the filtration rate is low, and the filter cloth is frequently clogged. This causes low productivity as well as production of only low concentration phosphoric acid solutions, due to the large quantities of water used for washing the filter cake.

Recently various improvements for facilitating the filtration and separation of gypsum, such as use of various thickeners or of drum filter, have been introduced. However, these improvements generally incur high equipment cost, and the phosphoric acid solutions produced have low concentrations such as 40–47% (as $H_3PO_4$, which corresponding to 30–34% as $P_2O_5$).

Also the preparation of relatively high concentration phosphoric acid by the so-called clinker process which comprises the steps of heating and milling the phosphate rock together with 98% sulfuric acid by means of a pugmill, heating the mixture to 200–240° C. or 350–400° C. to remove fluorine therefrom, and extracting the clinker with water, has been proposed (U.S. Pats. Nos. 2,384,813 and 2,384,814). However, when the mixture is heated to 200–240° C. in the above process, the by-product gypsum readily is disintegrated in water during the aqueous extraction of the clinker. Thus the filtering separation of the by-product anhydrous gypsum from the phosphoric acid produced becomes extremely difficult. Whereas, when the milled mixture is heated to 350–400° C., extraction of the phosphoric acid component from the clinker is very difficult. Consequently phosphoric acid is recovered only with very low yields such as 50% or less. Thus industrially both of the above processes proved to be failures.

As has been described above, the conventional manufacture of phosphoric acid by the wet process requires complex operations and large size equipment for the filtering separation of extremely fine, by-product gypsum from the phosphoric acid which is normally of low concentration and contains relatively large quantities of impurities such as Fe. Accordingly, the phosphoric acid as recovered must be further concentrated. Furthermore, the crude phosphoric acid must be purified by complex procedures.

The object of the subject invention is to provide a process for the preparation of phosphoric acid, in which the reaction product of phosphate rock with sulfuric acid retains the form of non-disintegrable small masses throughout the extraction of phosphoric acid component, and consequently the separation of by-product gypsum from the phosphoric acid can be very easily performed.

A further object of the invention is to provide a process for the preparation of phosphoric acid, by which it is possible to produce high concentration phosphoric acid at high yields, with a reduced number of steps and without employing special equipment.

Still another object of the invention is to provide a process in which high concentration phosphoric acid is recovered from phosphate rock in substantially refined form.

Other objects and advantages of the invention will become clear from the following descriptions.

According to the invention, the foregoing subjects are accomplished by the process for the preparation of phosphoric acid, which comprises adding at least one disintegration-preventing agent selected from the group consisting of alkali metal salts and amorphous silica, and sulfuric acid to calcium phosphate or phosphate rock, the quantity of the disintegration-preventing agent being no more than 30% based on dry weight of the calcium phosphate or phosphate rock, and furthermore the quantity (weight percent) satisfying the formula below:

$$A[M_2O] + [SiO_2] - [CaF_2] \geq 5.2$$

in which A is a number ranging from 5.8 to 7.2,
[$M_2O$] is the weight percent of the alkali metal as oxide, based on dry weight of the phosphate rock or calcium phosphate,
[$SiO_2$] is the weight percent of amorphous silica or the silicic acid component of alkali metal silicate as $SiO_2$ based on dry weight of phosphate rock or calcium phosphate, and
[$CaF_2$] is the weight percent of fluorine component containing in the phosphate rock expressed as $CaF_2$, with the proviso that when phosphate rock is used, the ratio of the alkali metal component [$M_2O$] is the total quantity of the alkali metal component contained in the starting phosphate rock and the alkali metal salt added to the system, and the ratio of amorphous silica [$SiO_2$] is the total quantity of the amorphous silica contained in the starting phosphate rock and the silica later added to the system, heating the resultant mixture to 100–300° C. to convert the same to perfectly solid, non-disintegrable small masses, and thereafter extracting phosphoric acid component from the masses.

Incidentally, in this specification the "perfectly solid, small masses" refers to solid blocks which do not themselves exhibit appreciable fluidity and plasticity.

During research in the pursuit of means to overcome the drawbacks in the conventional method of preparation of phosphoric acid, we made the following interesting discoveries. That is, the reaction mixture of calcium phosphate or phosphate rock with sulfuric acid readily disintegrates into finely divided gypsum in water or aqueus acid during the extraction of phosphoric acid component, even when the mixture is shaped into granulated solid in advance. Whereas, if an advance of, or simultaneously with, the blending of calcium phosphate or phosphate rock with sulfuric acid, an alkali metal salt such as sodium chloride and/or amorphous silica is added to the system, and the resultant mixture is shaped into solid masses by heating to 100*300° C., the small masses do not disintegrate in water or aqueous acid, but retain their original form. This is indeed an unexpected phenomenon.

In the invention, calcium phosphates [$Ca_3(PO_4)_2$, $CaH(PO_4)$, $CaH_4(PO_4)_2$], and various phosphate rocks can be used as the starting material. As the useful phosphate rock, apatite, phosphorite, coprolite, nodulephosphate guanophosphate, guano, etc. are preferred because of easy availability. While compositions of these rocks differ considerably depending on the place of origin and specific type, generally the composition of commercial phosphate rock is as follows:

|  | Percent |
| --- | --- |
| $P_2O_5$ | 30–40 |
| CaO | 44–52 |
| $Al_2O_3$, $Fe_2O_3$ | 0.5–2.5 |
| $SiO_2$ | 0.5–10.0 |
| $Na_2O$, $K_2O$ | 0.3–1.8 |
| F | 2–5 |

According to the invention, normally these rocks are first pulverized by dry or wet grinding. For an intimate blending thereof with sulfuric acid and alkali metal salt and/or amorphous silica, the rock is preferably given a grain size of the level that no less than 80% of the ground rock passes through 200 mesh size sieve.

These rocks contain phosphoric acid component as the calcium salt, and also contain minor quantities of impurities such Fe, As, Cr, Cu, Mn, V, etc., although the type of impurities somewhat differs depending on the type of specific rock.

In the invention, it is of course possible to use the commercial rocks as they are, but preferably those impurities, particularly the iron component, are removed in advance by such physical means as hydraulic or air elutriation, electrophoresis, and magnetic separation.

When those rocks of phosphorus are used as the starting material of the invention, the rocks are ground to average grain size of 150$\mu$ or below, preferably 50$\mu$ or below (passable through 300 mesh), suspended in a liquid medium, and sedimented under the influence of magnetism, whereby substantially the greatest part of $\alpha$-type iron component contained in the ores, e.g. 70–80%, can be removed.

According to the invention, an alkali metal salt and/or amorphous silica is added to above-described calcium phosphate or phosphate rock as a disintegration-preventing agent. As the alkali metal salt, various salts such as halides, sulfates, nitrates, carbonates, phosphates, hydroxides, oxides, sulfides, silicates, etc. of lithium, sodium and potassium, can be used. Furthermore, the salts of alkali metals useful for the invention are by no means limited to the above-listed inorganic salts, but it will be apparent that, for example, alkali metal salts of carboxylic acids of 1–4 carbons, which can react with sulfuric acid to form the sulfate of the alkali metal, such as sodium acetate, sodium citrate, potassium oxalate, etc. can also be used.

As the amorphous silica and amorphous silicate which are usable for the invention, the hydrogel and xerogel of silica, and amorphous alumina silica, calcia silica and magnesia silica may be named. In the specification, alumina silica, calcia silica and magnesia silica are referred to as "silica."

In the specification, the term "amorphous" is used to mean that the substance is amorphous when tested with diffraction of X-rays in the field of crystallography. Also the "amorphous silica" is not necessarily required to be perfectly pure, but may contain minor quantities of metallic impurities, such as the intermediate or final products of silica which are obtained from natural clay minerals.

The above alkali metal salts or amorphous silica may be used singly or in combination. The appropriate quantities of these disintegration-preventing or caking agents to be added vary considerably, depending also on the composition of the specific phosphate rock employed. Generally speaking, however, if an alkali metal salt alone is used, it is preferred to add the salt in such a quantity that no less than 0.8%, particularly 1% or above, of the alkali metal component in the form of oxide ($M_2O$), based on the dry weight of calcium phosphate or phosphate rock, should be contained in the system, as will be seen from the above-mentioned formula. Also when an amorphous silica alone is used, it is preferred to add no less than 5.2%, particularly 6% or more, of amorphous silica as $SiO_2$, based on the dry weight of calcium phosphate or phosphate rock.

On the other hand, according to our research, the quantity of the disintegration-preventing agent sufficient to prevent the disintegration of the massy reaction mixture of phosphate rock with sulfuric acid in water or aqueous acid solution varies considerably, depending on the contents of fluorine, amorphous silica and alkali metal component, of specific phosphate rock.

To wit, we discovered the following interesting fact in the process of searching for the subject invention. If 2 weight percent of sodium chloride is added to extra pure calcium phosphate reagent, and also an equivalent amount of sulfuric acid based on the calcium is added to the system to be blended, heated, dried and shaped into small masses, they do not disintegrate when thrown into water. However, if the extra pure calcium phosphate reagent is added with 2 weight percent thereof of sodium chloride, an equivalent amount of sulfuric acid based on the calcium, and 2 weight percent of $CaF_2$, blended, heated and shaped into small masses, disintegration of the masses in water is observed. Surprisingly, the disintegration can be perfectly prevented, when 2 weight percent of sodium chloride or silica gel is further added to the system as the additional disintegration-preventing agent, followed by heating.

The quantity of the disintegration-preventing agent to be employed varies appreciably according to the type of phosphate rock. But in any case, the quantity must satisfy the condition expressed by the empirical formula below, in order to perfectly prevent the disintegration of the blocky reaction mixture in accordance with the present invention:

$$A[M_2O]+[SiO_2]-[CaF_2]\geq 5.2$$

wherein A, [M₂O], [SiO₂] and [CaF₂] have the same meanings as defined above.

As can be understood from the above empirical formula, alkali metal salts exhibit markedly greater disintegration-preventing activity compared with amorphous silica. For this reason the use of alkali metal salts is particularly preferred in the invention.

According to the invention, it is satisfactory to use the disintegration-preventing agent in the quantity as will satisfy the above empirical formula. Use of excessively large quantity of the agent will not achieve further improved result, but the excessive disintegration-preventing agent will cause consumption of sulfuric acid. For this reason it is recommended to set the upper limit of the quantity of the disintegration-preventing agent as $M_2O$ or $SiO_2$, to be 30%, particularly 15%, based on the dry weight of calcium phosphate or phosphate rock, when using the alkali metal salt and amorphous silica either alone or in combination.

These alkali metal salts and/or amorphous silicas are added to calcium phosphate or phosphate rock, either in advance of, or simultaneously with, the addition of sulfuric acid. It is also permissible to add the disintegration-preventing agent to the phosphate rock before grinding of the latter, so that the grinding of the rock and blending thereof with the disintegration-preventing agent may be performed simultaneously.

According to the invention, use of an alkali metal halide such as sodium chloride is particularly suited for the preparation of substantially refined phosphoric acid, i.e., the product of low iron content. For instance, a very substantial portion of iron content, such as up to 80%, of phosphate rock can be removed by blending the rock with 0.2 to 10% of an alkali metal halide based on the dry weight of the former and heating the mixture to 300–1100° C. For removal of the iron content from phosphate rocks, halides of alkaline earth metals, aluminum or zinc can achieve results similar to those achieved by the use of alkali metal halides.

In the invention, the quantity of sulfuric acid to be added to calcium phosphate or phosphate rock is preferably at least equivalent to the entire metallic component present in the system, including the calcium content of the calcium phosphate or phosphate rock and alkali metal content of the disintegration-preventing agent, for a better recovery of phosphoric acid. Use of excessively greater than the equivalent amount of sulfuric acid is normally objectionable, because it causes mixing of a considerable amount of free sulfuric acid into the phosphoric acid recovered. For this reason it is recommended to use 0.8–1.2 equivalents, particularly 0.95–1.1 equivalents, of sulfuric acid to the entire metallic component present in the system, including calcium content of calcium phosphate or phosphate rock, and the metallic component of the disintegration-preventing agent. The sulfuric acid may be an aqueous solution, or may be anhydrous such as fuming sulfuric acid.

The sulfuric acid and calcium phosphate or phosphate rock are mixed by means of any suitable agitation device, in order to achieve an intimate blending and uniform reaction.

According to the invention, the operational conditions are so selected as to cause the reaction mixture of calcium phosphate or phosphate rock, disintegration-preventing agent and sulfuric acid to finally become non-disintegrable, perfectly solid, small masses. For example, if a large quantity of diluted sulfuric acid is used, a long period will be required for evaporating the water content. Thus, it is desirable to select the ratio of sulfuric acid as a liquid to calcium phosphate or phosphate rock so that the resultant reaction mixture should have a pasty or plasticized appearance. Thus the intimate blending and easy shaping of the mixture into perfectly solid, small masses can both be accomplished. The optimum ratio for this purpose is generally within the range of 60 to 150 parts by weight of sulfuric acid or aqueous solution thereof per 100 parts by weight of phosphate rock.

Upon mixing of phosphate rock, disintegration-preventing agent and sulfuric acid, a violent reaction takes place and the fluorine component contained in the rock is dissipated as a gas. After the dissipation rate of the fluorine component is lowered, the reaction mixture is shaped into perfectly solid, non-disintegrable, small masses. In the specification, the "reaction mixture" is not necessarily limited to the mixtures in which the reaction is completed, but intended to cover the mixtures in which reaction is partially performed.

In order to shape the reaction mixture into perfectly solid, small masses by heating, various means can be employed according to the state of the reaction mixture.

For example, if the reaction mixture of calcium phosphate or phosphate rock disintegration-preventing agent and sulfuric acid is obtained as wet, plasticized masses which themselves possess considerably large form-retention force, they are heated to, for example, 100–300° C. without further processing, and converted to solid, non-disintegrable small masses which of course may be further ground if necessary.

Also the wet, plasticized reaction mixture may be (1) extruded into a rod form through an extruder and cut into appropriate lengths if necessary, or (2) moulded into suitable configuration such as flake, column, dice, tablet or sphere, with any appropriate moulding machine, and then heated to, for example, 100°–300° C. to be converted to perfectly solid, non-disintegrable small masses. The above moulding operation (1) or (2), and the heating and drying operation may be performed simultaneously or separately.

As an alternative, (3) the pancake-like reaction mixture may be crushed as supplied to a rotary drum the inside atmosphere of which is heated to 100–300° C. and heated in the rotating drum to be converted to perfectly solid, non-disintegrable small masses. As such rotary drum, a rotary kiln, rotary drum drier optionally equipped with lifting flight, vibrating mill, ball mill, etc. can be used. The heating of the mixture may also be performed by blowing combustion gas or heated gas, for example, heated air, into the rotary drum. With this third method, it is possible to uniformly heat the reaction mixture, and small masses of excellent non-disintegrable property can be obtained.

Furthermore, when the reaction mixture is obtained as a fluidized mixture containing a relatively large amount of free water, the mixture is heated to 100–300° C. and converted to the perfectly solid, non-disintegrable small masses by means of shrinkage.

According to the invention, it is desirable to heat the reaction mixture at 100–300° C., particularly 120–250° C., for the purpose of preparation of the small masses. When the heating is performed at below 100° C., the resultant solid masses exhibit a minor tendency to disintegrate, and in order to prevent that, the mixture must be heated at that temperature level for an extremely long period. In that procedure, the removal of remaining fluorine component from the reaction mixture becomes difficult. Whereas, if the reaction mixture is heated to above 300° C., the yield of the phosphoric acid recovered from the solid masses by extraction exhibits a tendency toward abrupt decrease. The heating period is variable depending on the heating temperature, but normally may range from 10 minutes to 50 hours, particularly 0.5–50 hours. With this heating treatment, the reaction of sulfuric acid and the calcium component in the starting material of phosphoric acid is completed in the mixture.

In this invention, the small masses of the reaction mixture preferably have grain size of normally 0.5–50 mm. in diameter. When a mixture of phosphate rock, sulfuric acid and disintegration-preventing agent is heated and converted to the perfectly solid, non-disintegrable small masses, a large number of communicating pores are formed in the masses due to the dissipation of the gaseous fluorine component. This contributes to another advantage of the invention, in which the extraction of phosphoric acid component is easy even when the masses of the reaction product of phosphate rock with sulfuric acid have a relatively large grain size, such as 30 mm. in diameter. However, it is undesirable that the grain diameter should exceed 50 mm., since in such a case a considerably long period is required for the extraction of phosphoric acid component.

The mechanism with which the alkali metal salt and/or amorphous silica prevents the disintegration or degradation of the massy reaction product in water or aqueous acid solution is not yet clarified. However, in view of the fact that the disintegration of the mixture in water does take place when alkali metal salt and/or amorphous silica and sulfuric acid are mixed with calcium phosphate or phosphate rock without subsequent heating, or when calcium phosphate or phosphate rock is heated to 100–300° C. without the addition of alkali metal salt and/or amorphous silica, it can be understood that the disintegration-preventing effect of the agent in accordance with the invention is exhibited only when both the addition of alkali metal salt and/or amorphous silica and the subsequent heating to 100–300° C. are performed.

Then the phosphoric acid component is recovered from the small masses of the reaction product by means of known solid-liquid extraction operation. As the extraction medium, any known medium such as water, aqueous acid solution, and water-miscible organic solvent (e.g. cf. Ind. Chem. 53, p. 31 (1961)) may be optionally used. In the invention, it is preferred to use water and aqueous phosphoric acid solution as the extraction media. Also it is possible to recover high concentration aqueous phosphoric acid soluiton with high recovery ratios by contacting the small masses of reaction mixture first with high concentration phosphoric acid solution, and further contacting the same with aqueous phosphoric acid solutions of successively lowered concentrations, and finally with water. Of course aqueous solutions of acids other than phosphoric acid can be used as the extraction media. In the last cases, the recovered products will be in the form of aqueous solutions of mixed acids.

The extraction is practicable both continuously and batchwise, or may be performed in multi-stage system by combining a plural number of unit operations of batch-type extraction. Any known apparatus for extraction is usable. For example, mixer-settler, fixed or moving bed type extraction apparatus, continuous type horizontally rotating extractor, filter press type dialysis apparatus, etc. can be employed. Normally the step of separating the product phosphoric acid from by-product gypsum by sedimentation or filtration, which has been required in the conventional wet process for the manufacture of phosphoric acid, can be omitted.

Other extraction conditions vary considerably depending on the extraction medium and type of the extracting operation. It is preferred in the invention, however, to contact the extraction medium with the small masses of the reaction mixture at 5°–80° C., particularly 20°–50° C., for a period sufficient for the elution of phosphoric acid component of the mixture into the medium. Extraction at high temperatures tends to accelerate the corrosion of extraction vessel and distintegration of the massy extraction residue composed of by-product gypsum. The time or rate of extraction is dependent on such factors as type and quantity of extraction medium, grain size of the reaction mixture, and type of operation such as continuous or batch, but normally the contact time ranging from an hour to a week for single stage operation is sufficient.

Furthermore, according to a preferred embodiment of the invention, the small masses of the reaction mixture placed on a perforated supporter is held at the middle layer of the extraction medium, and the extraction liquid into which the phosphoric acid component of the reaction mixture is eluated is withdrawn from the lower layer With such means of extraction, high concentration phosphoric acid can be recovered.

In accordance with the present invention, the small masses of the reaction mixture do not disintegrate throughout the extracting operation, but maintain the original form of small masses. Thus the extraction of phosphoric acid component and the separation of the extract from by-product gypsum can be performed without obstructions such as clogging of filter, even when only a minor amount of extraction medium is used.

Furthermore, since the reaction of sulfuric acid with calcium phosphate or phosphate rock is already completed at a stage preceding the extraction according to the invention, the extraction of phosphoric acid component does not require high temperatures. This permits relatively low temperature extraction, which alleviates the problem of corrosion of the extraction vessel.

When aqueous phosphoric acid is used as the extraction medium, it is possible to recover aqueous phosphoric acid of 80% or higher $H_3PO_4$ concentration. Thus, the invention enables the recovery of 80% or higher concentration phosphoric acid at a yield as high as 99%, by contacting the small masses of reaction mixture with water as counter-currents to perform multi-stage extraction. Manufacture of such high concentration phosphoric acid is indeed surprising, in view of the fact that in the conventional wet process, the obtainable concentration is, at the best, approximately 47%.

In the invention, use of alkali metal halides as the disintegration-preventing agent is particularly advantageous. It has been discovered that, when an alkali metal halide is mixed with phosphate rock, impurities in the rocks such as iron and vanadium are volatilized during the reaction of the rock with sulfuric acid. Consequently, the contents of those impurities in the product phosphoric acid are markedly reduced.

Accordingly, when an alkali metal halide, particularly sodium chloride is mixed with phosphate rock together with sulfuric acid, and the reaction mixture is shaped into non-disintegrable small masses to be extracted by multi-stage method with water and aqueous phosphoric acid as the extraction media, phosphoric acid of 80% or higher concentration, which contains substantially no impurities such as iron, vanadium, etc., can be obtained at a yield as high as 99%.

Since the phosphoric acid obtained in accordance with the subject process is generally superior to the conventional products of the wet process in concentration and purity, the same can be directly used for industrial purposes. It is of course possible to remove from the phosphoric acid, free sulfate radical, solubilized silica and other impurities, by known means which are conventionally applied to the phosphoric acid manufactured by the wet process, and further concentrate or dilute the product according to the requirements of specific usages.

Hereinafter the invention will be explained with reference to working examples.

EXAMPLE 1

In this example, the procedures of intimately mixing phosphate rock from Morocco with sulfuric acid and sodium chloride, forming the reaction mixture into perfectly solid, non-disintegrable small masses in a rotary drum, and extracting phosphoric acid from the masses, are explained.

(A) Formation of perfectly solid, non-disintegrable small blocks

A rock from Morocco was selected as the starting phosphate rock, which was thoroughly ground to the sizes that the entire grains could pass the 200-mesh sieve.

The composition of the ground rock was as follows, the analysis values being percentages by weight.

| | |
|---|---:|
| Water | 1.13 |
| $P_2O_5$ | 36.62 |
| CaO | 52.89 |
| MgO | 0.28 |
| $Fe_2O_3$ | 0.42 |
| $Al_2O_3$ | 0.62 |
| $Na_2O$ | 1.15 |
| $K_2O$ | 0.15 |
| F | 4.29 |
| S | 0.66 |
| $SiO_2$ | 3.26 |

To 1 kg. of the finely divided phosphate rock 40 g. of sodium chloride was added as a disintegration-preventing agent, and the two were intimately mixed in dry system.

To the resultant mixture then, 1 kg. of 98% sulfuric acid (corresponding approximately to the equivalent to CaO content of the rock) was added at once under agitation. Immediately a violent exothermic reaction took place, during which the greatest part of fluorine content of the rock was volatilized. Due to the dissipation, the reaction product expanded to 2–3 times the original volume and had an appearance of a pancake. The pancake was crushed to suitable size masses, which were then thrown into an iron rotary drum of 40 cm. in diameter and 30 cm. in length. The drum was equipped with means for internal heating. The masses were heated in the drum for an hour, while the inside atmosphere was maintained at 180° C. and the drum was rotated at a rate of 30 r.p.m. With advance of the heating, the reaction product was further divided into small masses of approximately 5 mm.–1 mm. in diameter, and converted to brittle, debris-like masses. It was confirmed that the masses would not disintegrate in water.

(B) Extraction of phosphoric acid from the perfectly solid, non-disintegrable masses with water The above solid, non-disintegrable masses were thrown into an extraction tower filled with 1 liter of water. Subsequently, extraction and recovery of phosphoric acid using water as the extraction medium was performed by utilizing the characteristics of the non-disintegrable, small masses as described in detail hereinbelow. As the extraction tower, a columnar, hard polyvinyl chloride tube of 7 cm. in diameter and 40 cm. in height was used, and at a lower part of which a perforated plate to receive the masses was placed. Below that plate, an exit for the extraction liquid was provided, so that the extraction liquid of equal amount to that of the extraction medium poured from the upper part of the tower could be withdrawn from the exit by means of siphonage.

In this extraction tower, the non-disintegrable masses were left as immersed in water at room temperature for approximately 3 hours, in order to cause the elution of phosphoric acid component of the masses into the water. Immediately thereafter water as displacing extraction medium was dropped into the tower from the top, at a rate of 100 ml./hour. Thereupon 1 liter of crude phosphoric acid solution having a specific gravity of 1.26 was recovered from the masses, which contained 42.0% of phosphoric acid (as $H_3PO_4$) and each no more than 1% of impurities in the starting phosphate rock, i.e., iron, aluminum, magnesium, calcium, alkali metal and insoluble silica, as well as traces of organic matter present in the rock. Since the difference between the specific gravities of the extraction solvent and water which was used as the extraction solvent was great in the above extraction, the interface of the two phases was hardly disturbed. Thus a higher concentration phosphoric acid was recovered at a ratio of approximately 83% to $P_2O_5$ in the starting phosphate rock.

The extraction was performed continuously in the similar manner as above, using water as the extraction medium at the rate of 100 ml./hour, and 1 liter of a low concentration crude phosphoric acid solution having a phosphoric acid concentration of 8.0% (as $H_3PO_4$) and a specific gravity of 1.04 was recovered. The solution was useful as the extraction solvent of the small masses formed in the foregoing procedure A. Combining the phosphoric acid components of the high and low concentration crude phosphoric acid solutions, the recovery ratio was as high as approximately 99%.

Then the remaining masses in the extraction tower were washed with water in the similar manner. The anhydrous gypsum left as the residue was subjected to a quantitative analysis to determine the CaO and $P_2O_5$ contents thereof. The results were CaO 40.81% and $P_2O_5$ 0.27%, based on the dry matter. The decomposition ratio of the starting phosphate rock was calculated as the ratio of the remaining $P_2O_5$ to that in the starting rock. From the above result, it was approximately 99%, which perfectly corresponded with the recovery ratio by the extraction.

The anhydrous gypsum was recrystallized in the accepted manner and converted to crystalline gypsum.

EXAMPLE 2

Preparation of phosphoric acid from phosphate rocks from various places, and also from the rocks which were refined in advance, is explained in this example.

Eight types of phosphate rocks from North Carolina, Taiba, Togo, Western U.S., Makatea, Morocco, Kola (U.S.S.R.), and Florida were each ground to the sizes that the entire grains could pass through 200-mesh sieve.

As the refining pre-treatment, magnetic separation method was used for the purpose of removing particularly iron component. Among the rocks, those from Florida, Kola (U.S.S.R.), Makatea and Taiba were ground to the sizes that the entire grains can pass through 300-mesh sieve, and each was suspended in water to form 5% concentration suspensions. Into each suspension an electromagnet (input: 200 w.) having a magnetic flux density of approximately 1,000 gausses was inserted. Thus the α-type iron particles in the rocks were removed with the magnet while the suspensions were stirred. After filtering the water off, the remaining powders were dried and used as the starting materials of the subject process. The iron-removing ratios in this case were as follows, based on the entire iron contents of the original rocks:

| | Percent |
|---|---:|
| Florida | 71.9 |
| Kola (U.S.S.R.) | 81.1 |
| Makatea | 38.0 |
| Taiba | 58.3 |

The main compositions of the rocks are given in Table 1.

Sodium chloride and in some cases additional amorphous silica (finely divided silica gel) were added to each of the powdered rocks as the disintegration-preventing agent, in the amounts as indicated also in Table 1, and the both were intimately mixed together.

Then 98% sulfuric acid of the amount corresponding to equivalent to the CaO in each rock was added to each mixture in the manner described in procedure A of Example 1, and the reaction mixtures were maintained at 200° C. for an hour in rotary drums to be converted to non-disintegrable, fine and brittle blocks.

Then phosphoric acid was recovered from the blocks as described in procedure B of Example 1. The recovery ratio of each run as calculated in B of Example 1 is also given in Table 1.

From the same table, it can be understood that regardless the place of origin of the starting phosphate rock or subjection to the pre-treatment, the perfectly solid, small masses, which were obtained by the steps of adding the predetermined amount of disintegration-preventing agent, reacting the system with sulfuric acid and heating the reaction product, do not disintegrate in water during the subsequent extraction, and therefore phosphoric acid can be manufactured with high yields.

TABLE 1

| Starting phosphate rock | | | | | | | Disintegration-preventing agent (percent)[3] | | Recovery ratio of recovered phosphoric acid (percent) | Iron content of recovered phosphoric acid $Fe_2O_3/P_2O_5 \times 100$ |
|---|---|---|---|---|---|---|---|---|---|---|
| | Chief components (percent) | | | | | | Alkali metal salt (NaCl) | Amorphous silica ($SiO_2$) | | |
| Place of origin | $P_2O_5$ | CaO | $R_2O_3$[1] | $M_2O$[2] | $SiO_2$ | F | | | | |
| North Carolina | 32.60 | 52.56 | 1.33 | 1.28 | 2.97 | 3.59 | 4 | 0 | 97 | 1.2 |
| Taiba | 37.05 | 51.41 | 2.44 | 0.78 | 3.00 | 4.24 | 5 | 2 | 97 | 2.1 |
| Taiba (pre-treated) | 36.42 | 50.53 | 1.42 | 0.76 | 3.23 | 4.30 | 5 | 2 | 98 | 0.002 |
| Togo | 36.27 | 52.01 | 1.70 | 1.50 | 3.30 | 4.29 | 4 | 1 | 97 | 0.90 |
| Western U.S. | 31.24 | 47.03 | 2.66 | 1.09 | 9.43 | 3.29 | 3 | 3 | 97 | 4.4 |
| Makatea | 37.14 | 53.43 | 1.48 | 0.54 | 2.20 | 5.12 | 3 | 6 | 97 | 0.55 |
| Do | 37.14 | 53.43 | 1.48 | 0.54 | 2.20 | 5.12 | [4]3 | 6 | 97 | 0.60 |
| Makatea (pre-treated) | 37.10 | 53.24 | 1.35 | 0.52 | 2.40 | 5.01 | 3 | 6 | 98 | 0.003 |
| Morocco | 36.62 | 52.89 | 0.68 | 1.30 | 3.26 | 4.29 | 2 | 0 | 99 | 0.80 |
| Do | 36.62 | 52.89 | 0.68 | 1.30 | 3.26 | 4.29 | 0 | 5 | 99 | 1.1 |
| Kola (U.S.S.R.) | 38.86 | 51.39 | 1.23 | 0.29 | 1.02 | 3.36 | 4 | 0 | 98 | 0.32 |
| Do | 38.86 | 51.39 | 1.23 | 0.29 | 1.02 | 3.36 | 2 | 3 | 99 | 0.50 |
| Kola (U.S.S.R.) (pre-treated) | 38.50 | 50.79 | 0.84 | 0.30 | 1.10 | 3.40 | 3 | 3 | 99 | 0.001 |
| Florida | 36.34 | 51.14 | 2.05 | 0.54 | 4.62 | 4.20 | 3 | 2 | 98 | 1.2 |
| Do | 36.34 | 51.14 | 2.05 | 0.54 | 4.62 | 4.20 | [5]3 | 3 | 98 | 1.2 |
| Florida (pre-treated) | 36.95 | 50.62 | 1.04 | 0.55 | 4.65 | 4.20 | 3 | 2 | 98 | 0.001 |

[1] $R_2O_3$ is the combined percentage of $Al_2O_3$ and $Fe_2O_3$. Also α-type iron in the rock is expressed as $Fe_2O_3$.
[2] $M_2O$ is the combined percentage of $R_2O$ and $Na_2O$.
[3] The quantities of the agent added is expressed by weight percent to the starting powdered phosphate rock.
[4] KCl.
[5] $N_2SO_4$.

EXAMPLE 3

Preparation of phosphoric acid employing various alkali metal salts as the disintegration-preventing agent is explained in this example.

As the starting phosphate rock, that from Morocco employed in Example 1 was used.

To each 100 g. of the finely divided rock, various alkali metal salts were added in the amounts corresponding to 2% in terms of $M_2O$. The alkali metal salts were the following fifteen: LiCl, NaCl, $Na_2SO_4$, $NaNO_3$, $NaH_2PO_4$, $Na_2CO_3$, KCl, KBr, KI, $K_2CO_3$, $K_2HPO_4$, NaOH, $CH_3COONa$, $(COOK)_2$, and sodium silicate $$(Na_2O \cdot 3.2SiO_2)$$

To the resultant mixtures, each quivalent amount to CaO in the rock of 98% sulfuric acid was added, followed by the operations similar to procedure A of Example 1. Thus after an hour's heating at 200° C. in a rotary drum, brittle masses of the reaction products were obtained, which were extracted of phosphoric acid component with water in the same manner as described in procedure B of Example 1.

In order to show the extent of disintegration of the masses during the extraction, the disintegration ratio of each of the reaction products as thrown into water was determined. The results are shown in Table 2. The "disintegration ratio" was determined as follows: the reaction product masses were wrapped in wire screen of 1 mm. mesh size and after removing the masses sifted through the screen, the remaining masses as wrapped in the screen were thrown into water. Then the amount of the masses remained in the screen to that present before the immersion in water was expressed by percent by weight.

From the foregoing experiments, it can be understood from the results given in Table 2 that when various alkali metal salts were mixed with powdery phosphate rock, so far as their amounts were within the range to satisfy the empirical formula, $6.2[M_2O]+[SiO_2]-[CaF_2] \geq 5.2$, phosphorus acid was manufactured with satisfactory results.

TABLE 2

| Disintegration-preventing agent | | Disintegration ratio (percent) | Recovery ratio of phosphoric acid (percent) | Remarks |
|---|---|---|---|---|
| Alkali metal salt | Amount (wt. percent) | | | |
| LiCl | 3 | 0 | 98 | |
| NaCl | 3 | 0 | 98 | |
| NaCl | 2 | 0 | 98 | |
| NaCl | 1 | 30 | | |
| $Na_2SO_4$ | 2.5 | 0 | 98 | (1) |
| $NaNO_3$ | 3 | 0 | 98 | |
| $NaH_2PO_4 \cdot 2H_2O$ | 5 | 0 | 98 | |
| $Na_2CO_3$ | 3 | 0 | 98 | |
| NaOH | 2 | 0 | 97 | |
| KCl | 2 | 0 | 98 | |
| KCl | 1 | 50 | | |
| KCl | 0.5 | 100 | | |
| KBr | 3 | 0 | 98 | |
| KI | 4 | 0 | 98 | |
| $K_2CO_3$ | 2 | 0 | 98 | |
| $K_2HPO_4$ | 2.5 | 0 | 98 | |
| $CH_3COONa$ | 5 | 0 | 97 | |
| $(COOK)_2$ | 5 | 0 | 97 | |
| Sodium silicate | 5 | 0 | 97 | |
| None | 0 | 100 | | |

[1] The by-product gypsum was markedly superior to the others with respect to color tone.

EXAMPLE 4

The significance of temperature and time variation in the formation of perfectly solid, non-disintegrable masses is explained in this example.

As the starting phosphate rock, that produced in Morocco which was employed in Example 1 was used.

As the disintegration-preventing agent, 3% of sodium chloride to the powdered rock was added, and the two were intimately mixed together.

Reacting the mixture with 98% sulfuric acid in the manner described in procedure A of Example 1, a pancake-like reaction product was obtained. The pancake was crushed into the pieces of approximately 3 mm. in diameter, and heated in electric ovens at varied temperatures of 120° C., 150° C., 180° C., 210° C., 250° C., 300° C., 350° C., and 400° C., and left at the same temperatures for 30 minutes to 4 days. In all cases, brittle, debris-like masses of the reaction products were obtained.

As the control, the addition of sodium chloride as the disintegration-preventing agent was omitted in the above procedures, and similarly brittle, debris-like masses were prepared in the above manner, from the reaction product of the powdered rock alone with sulfuric acid.

Those masses were thrown into water in the manner described in Example 3, and the disintegration ratio of the product of each run was determined. The results are given in Table 3. The controls were also heated for the period at which the disintegration ratio of the masses prepared with the addition of disintegration-preventing agent became zero (the point at which no disintegration took place), and their disintegration ratios were determined.

The masses formed of each run were thoroughly washed with water so that the soluble phosphoric component therein should be completely removed, and the residues composed chiefly of gypsum were subjected to quantitative analysis to be determined of their CaO and $P_2O_5$ contents. From the analysis results, the decomposition ratio of the starting phosphate rock as to $P_2O_5$ in each run was calculated. The results are also given in Table 3.

From those experiments, the following can be understood. Even when the disintegration-preventing agent is added, a long treating time is required to make non-disintegrable masses if the heating temperature is low. Particularly when the temperature is below 100° C., non-disintegrable masses cannot be obtained. The treating time can be shortened by raising the heating temperature, but excessively high temperature tends to lower the decomposition ratio. Therefore, in order to achieve excellent decomposition, it is preferred to form the small masses at a lowest permissible temperature.

Furthermore, it can also be understood that when the treating temperature is above 350° C., the reaction product containing no disintegration-preventing agent shows reduced disintegration ratio in water, but simultaneously the decomposition ratio also is lowered; and that at 400° C., the decomposition ratio becomes as low as 5% or even less, and the product is unsuitable for any practical usage.

TABLE 3

| Treating temperature of pasty mass of reaction product (° C.) | Amount of sodium chloride (percent) | Treating time (hour) | Disintegration ratio (percent) | Decomposition ratio (percent) |
| --- | --- | --- | --- | --- |
| 80 | 3 | | 100 | 98 |
|    | 0 | | 100 | 98 |
| 120 | 3 | 50 | 0 | 99 |
|     | 0 | 50 | 100 | 98 |
| 150 | 3 | 40 | 0 | 99 |
|     | 0 | 40 | 100 | 98 |
| 180 | 3 | 10 | 0 | 99 |
|     | 0 | 10 | 100 | 98 |
| 210 | 3 | 1 | 0 | 98 |
|     | 0 | 1 | 95 | 97 |
| 250 | 3 | 0.5 | 0 | 94 |
|     | 0 | 0.5 | 80 | 92 |
| 300 | 3 | 0.5 | 0 | 86 |
|     | 0 | 0.5 | 30 | 85 |
| 350 | 3 | 0.4 | 0 | 43 |
|     | 0 | 0.4 | 5 | 40 |
| 400 | 3 | 0.3 | 0 | 4.5 |
|     | 0 | 0.3 | 0 | 4.0 |

EXAMPLE 5

An another embodiment for making the perfectly solid, non-disintegrable small masses is explained in this example.

A reaction product was prepared in the similar manner to Example 1, except that 80 wt. percent aqueous sulfuric acid was used. Because of that change, the product was obtained as a plasticized, pasty mass instead of the pancake form.

The pasty mass was granulated into columns of 4 mm. in diameter by means of a meat grinder (the hole diameter of which was 4 mm.). Letting the granules stand in hot air current of 200° C. for 40 minutes, brittle, columnar masses of approximately 4 mm. in diameter were obtained, which did not disintegrate in water.

The following extraction of phosphoric acid from the masses as described in procedure B of Example 1 achieved the recovery of phosphoric acid with a high yield of 98.5%.

EXAMPLE 6

Preparation of phosphoric acid by extraction of the heat-treated, non-disintegrable masses of approximately 30 mm. in diameter is explained in this example.

A pancake-like reaction product was prepared from powdered phosphate rock from Morocco, sodium chloride and sulfuric acid, in accordance with precedure A of Example 1. The product mass was reduced in size to have diameters ranging approximately from 40–30 mm. and maintained at 200° C. in a desiccator for approximately 2 hours. Thus brittle masses of approximately 30 mm. in diameter were obtained, which showed non-disintegrable tendency in water.

The masses were packed in an extraction tower in accordance with the procedure B of Example 1, and water as the displacing solvent was dropped thereon at a rate of 50 ml./hour. Thus approximately 40% concentration ($H_3PO_4$) crude phosphoric acid was recovered.

By continuing the extraction similarly to the procedure B of Example 1, phosphoric acid was recovered at the total recovery ratio of 97.5%.

From the above result, it can be understood that even when the heat-treated, non-disintegrable masses have large diameters such as approximately 30 mm., phosphoric acid can be recovered therefrom at high yields.

EXAMPLE 7

Preparation of high concentration phosphoric acid solution is explained in this example.

Heat-treated non-disintegrable masses were prepared in the similar manner to Example 1.

(A) Six hundred (600) g. of the masses were thrown into the extraction tower described in procedure B of Example 1 which was filled with 300 ml. of the 42.0% ($H_3PO_4$) crude phosphoric acid solution recovered in Example 1, and let stand for 5 hours. In the meantime, the reacted phosphoric acid component was eluted. Immediately thereafter the 8% ($H_3PO_4$) crude phosphoric acid solution obtained in procedure B of Example 1 was dropped into the system from the top of the tower as the displacing solvent. Recovering the phosphoric acid solution in the similar manner described in procedure B of Example 1, 300 ml. of 68% ($H_3PO_4$) crude phosphoric acid was obtained. Successively the masses in the tower were washed with water. Thus 300 ml. of 15.5% ($H_3PO_4$) crude phosphoric acid was recovered, which was used as the displacing solvent of the masses of next batch. Further washing the masses in the tower with water, 300 ml. of 7% ($H_3PO_4$) crude phosphoric acid solution was obtained. The total recovery ratio of phosphoric acid from the foregoing four-stage operations was 98.5%.

(B) Then, again 600 g. of the heat-treated, non-disintegrable small masses prepared in the similar manner to Example 1 were thrown into the same extraction tower which was filled with the 68% crude phosphoric acid solution recovered from the preceding procedure A. Similarly to the previous practice, the 15.5% crude phosphoric acid solution was used as the displacing solvent. Thus 300 ml. of 81% ($H_3PO_4$) crude phosphoric acid was obtained. Repeating the extracting operation as described in A above in succession, low concentration crude phosphoric acid solutions were obtained, which could be used as the displacing extraction solvent. The recovery ratio of the phosphoric acid from the total four stages of extraction was 98.5%.

From the foregoing, it can be understood that by repeating the similar procedures, high concentration phosphoric acid solution containing 80% or more phosphoric acid can be recovered at high yields.

EXAMPLE 8

Preparation of colorless, pure phosphoric acid is explained in this example.

The phosphate rock from Morocco used in Example 1 was employed as the starting material, which was thoroughly ground into fine powder in wet system, and removed of foreign elements by hydraulic elutriation. Furthermore, α-type iron component in the rock was removed by the magnetic separation method as described in Example 2, and water content was filtered off. The remaining powdered rock was dried, and intimately mixed with 3 wt. percent of calcium chloride ($CaCl_2 \cdot 2H_2O$) as a metal halide, followed by a sintering of 900° C. for 10 minutes. Thereupon, the ferric compounds contained in the rock were removed as ferric halides. Thus the phosphate rock was purified. The composition of the purified powder of the rock was as follows:

| | Percent |
|---|---|
| $P_2O_5$ | 37.05 |
| CaO | 53.64 |
| MgO | 0.28 |
| $Fe_2O_3$ | 0.01 |
| $Al_2O_3$ | 0.60 |
| $M_2O$ | 1.20 |
| F | 4.32 |
| S | 0.65 |
| $SiO_2$ | 0.22 |
| Water | 2.16 |

In the above, $M_2O$ is the combined value of $K_2O$ and $Na_2O$.

To 1 kg. of the powdered rock thus refined with magnetic separation and metal halide treatment, 50 g. of sodium chloride in hydrous state was added and intimately mixed together. The mixture was reacted with sulfuric acid by the operation similar to the procedure A of Example 1, and the reaction mixture was heated to 180° C. for 2 hours in a rotary drum. Thus brittle, debris-like, non-disintegrable masses were obtained.

Phosphoric acid was extracted from the masses with water in the manner as described in procedure B of Example 1. The product was colorless, transparent phosphoric acid, and the yield was as high as 96.5%.

Identification of metallic impurities in the colorless, transparent phosphoric acid with an emission spectrophotometer detected presence of Mg and Al, but it was confirmed that the coloring metallic impurities such as Fe, V, etc. were substantially prefectly removed. Thus it can be understood that pure phosphoric acid was recovered in accordance with the foregoing procedures.

What is claimed is:

1. A process for the preparation of phosphoric acid which comprises adding sulfuric acid and at least one disintegration-preventing agent selected from the group consisting of alkali metal salts and amorphous silica to calcium phosphate or phosphate rock, the quantity of the disintegration-preventing agent being no more than 30% based on the dry weight of the calcium phosphate or phosphate rock, said quantity (weight percent) satisfying the formula:

$$A[M_2O]+[SiO_2]-[CaF_2]\geq 5.2$$

in which A is a number ranging from 5.8 to 7.2 [$M_2O$] is the weight percent of the alkali metal as oxide, based on dry weight of the calcium phosphate or phosphate rock, [$SiO_2$] is the weight percent of amorphous silica or the silicic acid component of alkali metal silicate as $SiO_2$ based on dry weight of the phosphate rock or calcium phosphate, and [$CaF_2$] is the weight percent of the fluorine component contained in the phosphate rock expressed as $CaF_2$, which the proviso that when phosphate rock is used, the ratio of the alkali metal component [$M_2O$] is the total quantity of the alkali metal component contained in the starting phosphate rock and the alkali metal salt added to the system, and the ratio of amorphous silica [$SiO_2$] is the total quantity of the amorphous silica contained in the starting phosphate rock and the silica later added to the system, heating the resultant mixture to 100–300° C. to convert the same to perfectly solid, small masses which do not disintegrate in a phosphoric acid extraction medium, and thereafter extracting phosphoric acid component from the masses with said medium.

2. The process of claim 1 in which 0.8 to 1.2 equivalents of sulfuric acid, based on the entire metallic components of the calcium phosphate or phosphate rock and the disintegration-preventing agent, is used.

3. The process of claim 1 in which the sulfuric acid is added at such a ratio as will cause the mixture of calcium phosphate or phosphate rock, disintegration-preventing agent and the sulfuric acid to become pasty or plasticized.

4. The process of claim 1 in which the alkali metal salt is selected from the group consisting of halides, sulfates, nitrates, phosphates, carbonates, hydroxides, oxides, sulfides, silicates and carboxylates of 1–4 carbon atoms.

5. The process of claim 1 in which the disintegration-preventing agent is sodium chloride.

6. The process of claim 1 in which the mixture is heated to 120–250° C.

7. The process of claim 1 in which the phosphoric acid component is extracted from the masses, by contacting said masses with an extraction medium selected from the group consisting of water and aqueous phosphoric acid solution.

8. A process for the preparation of phosphoric acid which comprises adding sulfuric acid and at least one disintegration-preventing agent selected from the group consisting of alkali metal salts and amorphous silica calcium phosphate or phosphate rock, the quantity of the disintegration-preventing agent being no more than 30% based on the dry weight of the calcium phosphate or phosphate rock, said quantity (weight percent) satisfying the formula:

$$A[M_2O]+[SiO_2]-[CaF_2]\geq 5.2$$

in which A is a number ranging from 5.8 to 7.2, [$M_2O$] is the weight percent of the alkali metal as oxide, based on dry weight of the calcium phosphate or phosphate rock [$SiO_2$] is the weight percent of amorphous silica or the silicic acid component of alkali metal silicate as $SiO_2$ based on dry weight of the phosphate rock or calcium phosphate, and [$CaF_2$] is the weight percent of the fluorine component contained in the phosphate rock expressed as $CaF_2$, with the proviso that when phosphate rock is used, the ratio of the alkali metal component [$M_2O$] is the total quantity of the alkali metal component contained in the starting phosphate rock and the alkali metal salt added to the system, and the ratio of amorphous silica [$SiO_2$] is the total quantity of the amorphous silica contained in the starting phosphate rock and the silica later added to ehe system, the quantity of the sulfuric acid being 0.8 to 1.2 equivalents based on the entire metallic components in the calcium phosphate or phosphate rock and disintegration-preventing agent, and the liquid content of the sulfuric acid being such that the mixture of the calcium phosphate or phosphate rock, disintegration-preventing agent and the sulfuric acid becomes pasty or plasticized; heating the mixture to 100–300° C. for 10 minutes to 50 hours, thereby forming perfectly solid, masses of 0.5–50 mm. in grain diameters which do not disintegrate in a phosphoric acid extraction medium consisting of water or aqueous phosphoric acid solution, and thereafter contacting the masses with said medium to extract the phosphoric acid component of the masses.

9. The process of claim 8 in which the pasty or plasticized mixture is treated for 10 minutes to 50 hours in a rotary drum containing a heated atmosphere of 100–300° C. to form said pasty or plasticized mixture into small masses.

10. The process of claim 8 in which the aqueous phosphoric acid solution utilized for the extraction has a phosphoric acid concentration of up to 70 percent by weight.

References Cited

UNITED STATES PATENTS

| | | | |
|---|---|---|---|
| 3,161,467 | 12/1964 | Hignett et al. | 23—165 |
| 3,420,628 | 1/1969 | Robinson | 23—165 |

OSCAR R. VERTIZ, Primary Examiner

G. A. HELLER, Assistant Examiner